(12) United States Patent
Xavier et al.

(10) Patent No.: US 8,478,664 B1
(45) Date of Patent: Jul. 2, 2013

(54) RECOMMENDATION SYSTEM WITH USER INTERFACE FOR EXPOSING DOWNSTREAM EFFECTS OF PARTICULAR RATING ACTIONS

(75) Inventors: Joseph Xavier, Seattle, WA (US); George M. Ionkov, Seattle, WA (US); Jeffrey D. Lehman, Lynnwood, WA (US); Japan S. Doshi, Bellevue, WA (US); Sandy Wenling Qiu, Seattle, WA (US); Bobby P. Nath, Des Moines, WA (US)

(73) Assignee: Amazon Technologies, Inc., Reno, NV (US)

( * ) Notice: Subject to any disclaimer, the term of this patent is extended or adjusted under 35 U.S.C. 154(b) by 6 days.

(21) Appl. No.: 13/280,593

(22) Filed: Oct. 25, 2011

(51) Int. Cl.
*G06Q 30/00* (2006.01)
(52) U.S. Cl.
USPC ........ 705/26.7; 705/26.1; 705/26.8; 705/27.1
(58) Field of Classification Search
USPC .............................. 705/26.1, 26.7, 26.8, 27.1
See application file for complete search history.

(56) References Cited

U.S. PATENT DOCUMENTS

| | | | |
|---|---|---|---|
| 6,064,980 A | 5/2000 | Jacobi et al. | |
| 6,438,579 B1 | 8/2002 | Hosken | |
| 6,912,505 B2 | 6/2005 | Linden et al. | |
| 7,295,995 B1 | 11/2007 | York et al. | |
| 7,310,612 B2 | 12/2007 | McQueen, III et al. | |
| 7,689,457 B2 | 3/2010 | Chan et al. | |
| 7,720,723 B2 | 5/2010 | Dicker et al. | |
| 7,921,071 B2 | 4/2011 | Hicks | |
| 7,966,334 B1 | 6/2011 | Bezos et al. | |
| 7,975,020 B1 | 7/2011 | Green et al. | |
| 2002/0103692 A1* | 8/2002 | Rosenberg et al. | 705/10 |
| 2006/0026048 A1* | 2/2006 | Kolawa et al. | 705/7 |
| 2008/0270265 A1* | 10/2008 | Al-Azzawe | 705/27 |
| 2009/0125588 A1 | 5/2009 | Black et al. | |

OTHER PUBLICATIONS

Schafer, et al., "E-Commerce Recommendation Applications," Data Mining and Discovery, vol. 5, Nos. 1-2, Jan. 2001, pp. 115-153.

* cited by examiner

*Primary Examiner* — Courtney Stopp
(74) *Attorney, Agent, or Firm* — Knobbe, Martens, Olson & Bear, LLP

(57) ABSTRACT

An interactive system generates personalized item recommendations for users based partly or wholly on ratings assigned by the users to particular items. The system includes an item rating user interface that enables a user to view, prior to rating an item, information regarding the types of items that will be recommended to the user if the user assigns a particular rating or type of rating to the item. The user interface thereby enables users to refrain from performing rating actions that will tend to result in low utility or "poor quality" recommendations from the users' perspectives.

12 Claims, 4 Drawing Sheets

RECOMMENDATION SYSTEM WITH USER INTERFACE FOR EXPOSING DOWNSTREAM EFFECTS OF PARTICULAR RATING ACTIONS

TECHNICAL FIELD

The present disclosure relates to recommendation and personalization systems. More specifically, the disclosure relates to user interfaces for enabling users to rate items and to obtain item recommendations.

BACKGROUND

Some web sites and other types of interactive systems implement recommendation services for generating personalized recommendations of items stored or represented in a data repository. One common application for recommendation services involves recommending items for purchase, rental, subscription, viewing, or some other form of consumption. For example, some e-commerce sites provide services for recommending products to users based wholly or partly on the ratings assigned by the users to particular items. The recommendations may additionally or alternatively be based on the users' purchase histories, rental histories, product viewing histories, item tagging activities, and/or other behavioral profiles. Recommendation services are also commonly used to recommend web sites, news articles, music and video files, television shows, restaurants, and other types of items.

One problem with existing recommendation services is that a user's favorable rating of an item may, in certain circumstances, frequently or primarily result in recommendations of items the user dislikes. This may occur when, for example, the user likes (and thus favorably rates) a particular item, but generally dislikes the item's category. For example, a user may like a particular song or artist in the category of country music, but may generally dislike country music. A favorable item rating may also undesirably result primarily in recommendations of items the user already owns or is familiar with.

BRIEF DESCRIPTION OF THE DRAWINGS

Specific embodiments and inventive features will now be described with reference to the drawings, which are provided for purposes of illustration, and not limitation.

DETAILED DESCRIPTION OF SPECIFIC EMBODIMENTS

The present disclosure provides a recommendation system and associated user interface that enable users to rate individual items, such as catalog items, with knowledge of the downstream effects of particular rating actions. For example, before a user favorably rates a particular item, the user interface may inform the user of the type or types of items that will be recommended to the user as a consequence of the favorable rating. The user interface thereby enables users to knowingly (1) perform rating actions that will tend to result in high quality item recommendations (where "quality" is a measure of how useful the recommendations are to the particular user), and (2) refrain from performing rating actions that will tend to result in poor quality recommendations.

The user interface may be used with any type of interactive system (such as a web site, a mobile application based system, or an interactive television system) that generates personalized item recommendations for users based partly or wholly on users' ratings of particular items. For example, the user interface may be part of an interactive system that provides functionality for users to purchase, rent, download, and/or stream products selected from an electronic catalog. The products may, for example, include physical products that are shipped to users, digital products (e.g., music tracks, electronic books, videos, mobile applications, etc.) that are transmitted to users' computing devices, or a combination thereof. The user interface may also be used in systems that recommend various other types of items, such as restaurants, television shows, news articles, web sites, magazine subscriptions, authors, blogs, podcasts, musical artists, brands, services, service providers, entertainment events, vacation destinations, and other users.

Figure 1:
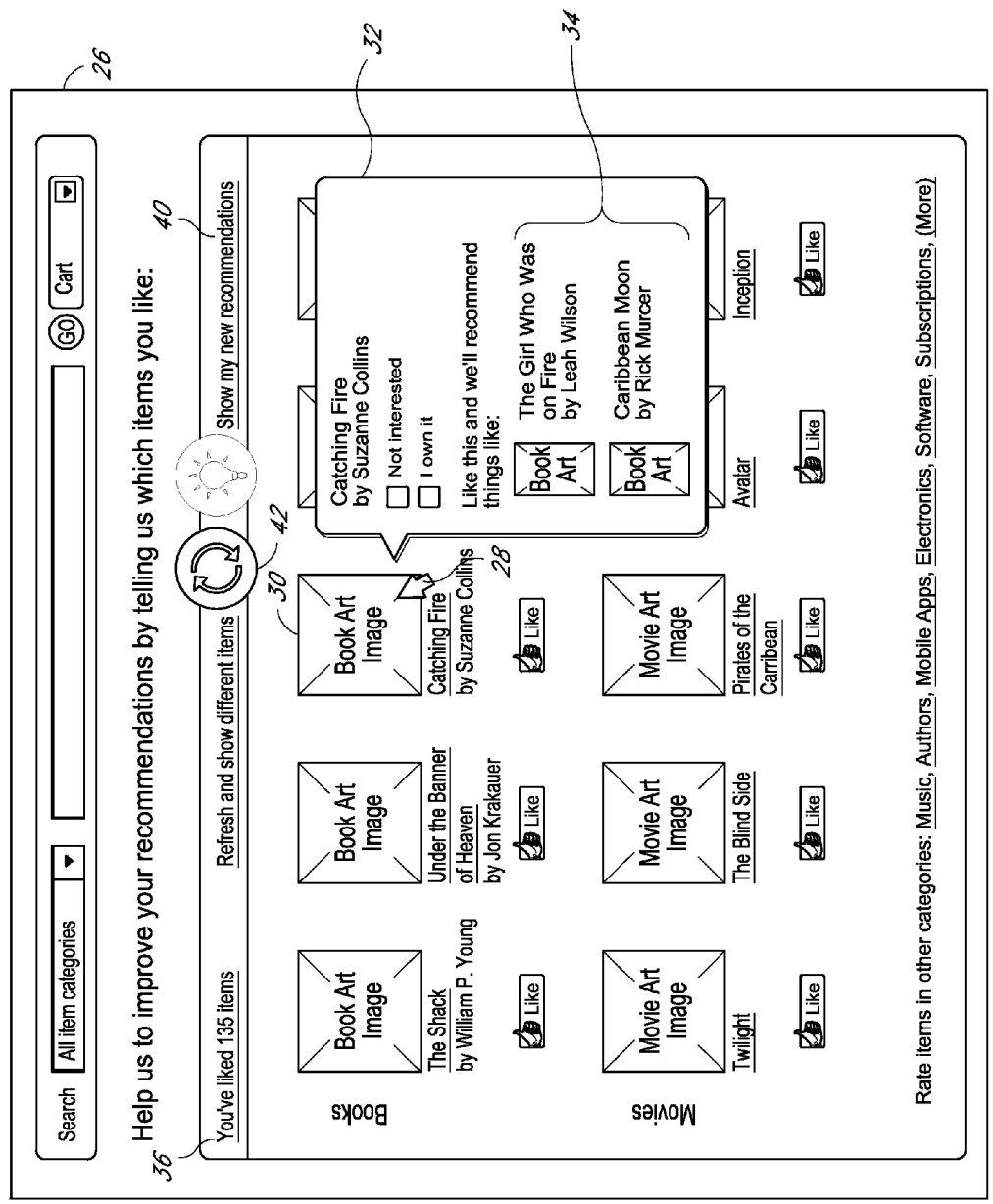
FIG. 1 illustrates one embodiment of a user interface that enables a user to rate individual items and to view information regarding the downstream effects of particular rating actions.

FIG. 1 illustrates one embodiment of the user interface, and more specifically, illustrates a personalized item rating web page 26 for rating items represented in an electronic catalog. As will be recognized, the user interface may alternatively be implemented without using web pages. For example, the user interface may be implemented within a mobile application (such as a smartphone application), or within the native software of an e-book reader or a tablet computing device. In this particular example, the item rating page 26 displays a set of book titles and movie titles that have not yet been rated by the user, and provides a user option to rate each such item. The two illustrated item categories (books and movies) are merely representative of the types of items that can be rated.

In the illustrated embodiment, the option to rate each item includes a corresponding "Like" button displayed below the respective item's image/description. Any of a variety of other types of rating display elements may additionally or alternatively be provided. For example, rather than displaying "Like" buttons, the user interface may provide interactive display elements for rating each item on a scale of one to five stars (or on some other scale). As another example, both "Like" and "Dislike" rating options may be provided for each item.

As depicted in FIG. 1, when the user hovers the mouse cursor or pointer 28 over a particular item's graphic 30 or description (or otherwise selects the item), the user is presented with a popover 32 corresponding to the selected item. (A "popover," in the context of web pages, is an overlay display object that is part of the web page, and which can be generated using executable code included in the web page; see, e.g., U.S. Pat. No. 7,975,020.) By moving the mouse cursor 28 from item to item on the page, the user can interactively view the popovers corresponding to the respective not-yet-rated items 30.

Each popover 32 (one shown) includes a "downstream recommendations" list 34 that advantageously notifies the user of one or more types of items that will be recommended to the user if the user favorably rates the selected item 30. As explained below, each such list 34 may be personalized for the particular user viewing the page. In the illustrated example, the popover 32 informs the user that "Liking" the book title "Catching Fire" will cause items like the book titles "The Girl Who Was on Fire" and "Caribbean Moon" to be recommended. The particular items included in the list 34 may not actually be recommended to the user if the user favorably rates the item 30; however, they are at least representative of the types of items likely to be recommended as a result of a favorable rating.

Thus, the downstream recommendations list 34 advantageously enables the user to assess the effect of the rating action before deciding whether to rate the selected item 30. For example, if the user dislikes the downstream recommendation items 34, the user may choose not to favorably rate the selected item 30, even though the user actually likes it. As another example, the user may choose not to favorably rate the selected item if the user already owns or is very familiar with the recommended items. (In general, recommendations tend to be less useful when the user is already familiar with the particular items being recommended.) Thus, the system enables the user to selectively rate items in a manner that increases the utility of the recommendations subsequently provided to the user.

A greater or lesser number of downstream recommendation items 34 (e.g., one, three, four or five) may alternatively be displayed in each popover 32. In addition, although the two downstream recommendation items 34 shown in FIG. 4 correspond in item category (namely "books") to the selected item 30, this need not be the case. For example, the system may enable other categories of downstream recommendation items (e.g., movies, music titles, etc.) to be displayed in the popovers for books.

In the embodiment shown in FIG. 1, each popover additionally includes (1) a checkbox for assigning a "not interested" rating to the selected item 30, and (2) a checkbox for indicating ownership of the selected item 30. The "not interested" and item ownership information collected by the system through these display elements for a particular user may be used to refine the personalized item recommendations generated for the user. For example, a preliminary set of personalized item recommendations may be filtered to remove any "already owned" and "not interested" items, and to remove any items that are similar to the users' "not interested" items. The "not interested" and "I own it" elements may alternatively be omitted.

The item rating page 26 shown in FIG. 1 represents one example of how the downstream effects of particular rating actions can be communicated to users. Numerous variations are possible. The following are examples:

1. The popovers 32 may include other information about the types of items that will be recommended if the selected item is favorably rated. For example, in addition to, or instead of, displaying a list of would-be recommended items 34, a popover 32 may inform the user more generally of the types or attributes of items that will be recommended (e.g., "acoustic and classical music titles" or "mystery novels by authors like . . . ").
2. The user may be given the option to rate particular item categories or item attributes (e.g., brands, authors, artists, musical genres, etc.), and may be informed of the downstream effects of the associated rating actions in the same manner as described above. For example, a user may be notified that favorably rating a particular author "will cause books like . . . to be recommended" or "will cause books from authors like . . . to be recommended."
3. The user may be presented with multiple rating options for a selected item (e.g., one to five stars, or "like" and "dislike"), and may be notified of the downstream effects of each such option. For example, the "recommended items" list 34 may change automatically depending on which rating option is currently provisionally selected by the user.
4. The "downstream effect" information may be displayed without the use of popovers. For example, this information may be displayed at the outset when the page is loaded by the browser, and thus without the need for the user to mouse-over or otherwise select particular items 30.
5. The popover 32 or other user interface may provide a user option to favorably rate the item but to request that the rating not be used for generating recommendations. For example, a checkbox may be provided with the following messaging: "I like this item, but do not want it to be used to generate recommendations for me." If the user selects this rating option, the system may increment the item's global "like" count (which may be displayed on the item's detail page), but may exclude/disregard this rating when subsequently generating recommendations for the user.
6. Both "Like" and "Dislike" buttons may be displayed for each non-yet-rated item 30. When the user hovers the cursor 28 over the "Like" button, a popover 32 similar to the one shown in FIG. 1 may be displayed. When the user hovers the cursor over the "Dislike" button, a different popover may be displayed which identifies the types of items that will be filtered out or otherwise excluded from the user's recommendations as the result of a Dislike rating.

These and other variations may be included individually, or in any combination, in embodiments of the invention. In the particular embodiment shown in FIG. 1, when the user clicks on the "Like" button for a particular item, the user's selection is communicated from the user's computing device to a server, and the item rating page 26 is updated to reflect the selection. The updates to the page 26 preferably include the following: (1) the rated item is replaced on the page with a new item that has not yet been rated; (2) the running count 36 of the number of items "Liked" by the user is incremented, and (3) if this rating event is the first rating action performed on the page 26, the "Show my new recommendations" link 40, which is initially grayed out, becomes active (selectable) on the page. The page also includes a "refresh and show different items" link 42 that can be selected to refresh the page with a new set of not-yet-rated items.

If/when the user selects the "Show my new recommendations" link 40 on the item ratings page 26, the user's computing device retrieves and displays personalized item recommendations that reflect the item rating action(s) performed on the item rating page 26. Typically, these item recommendations are based on multiple item rating actions of the user. For example, the recommendations may be based on all rating actions performed by the user or a most recent subset of these actions (e.g., the last N "Liked" items). The personalized recommendations may also be based on other types of item selection actions recorded by the system, such as user selections of particular items to purchase, rent, view, review, add to a shopping cart, add to a wish list, add to a rental queue, or tag. The personalized recommendations are preferably generated using a recommendation algorithm that is similar or identical to that used to generate the downstream recommendations lists 34.

In one embodiment, the personalized item recommendations are presented in a recommendations popover (not shown) that overlays and hides the not-yet-rated items on the item rating page 26. The recommendations may alternatively be presented on a separate page. Each recommendation may be presented together with an indication of the basis (or bases) for the recommendation. For example, a recommendation of item A may be displayed with the message "recommended because you said you liked item B," or "recommended because you said you liked item C and item D." After viewing the item recommendations, the user can close the recommendations popover and continue rating items.

Item ratings interfaces of the type shown in FIG. 1 may be exposed to users in various contexts. For example, in the context of a shopping site or video rental site, such an interface may be presented when a user first sets up an account with the system. The user interface may thereby enable the system to rapidly collect sufficient items ratings data to provide useful item recommendations to new customers. The site may also enable users to return to the item ratings interface 26 at any time to rate additional items.

Popovers 32 (or other user interface display units) of the type shown in FIG. 1 may also be presented on other types of pages that provide functionality for rating items. For example, each item detail page of an electronic catalog may include one or more display elements for rating the item, and may include an associated popover 32 for enabling the user to selectively view the downstream recommendation effects of positively (or otherwise) rating the item. Popovers 32 of the type shown in FIG. 1 may also be exposed on item recommendation pages, item category or "browse node" pages, and other types of pages that include item rating functionality.

Figure 2:
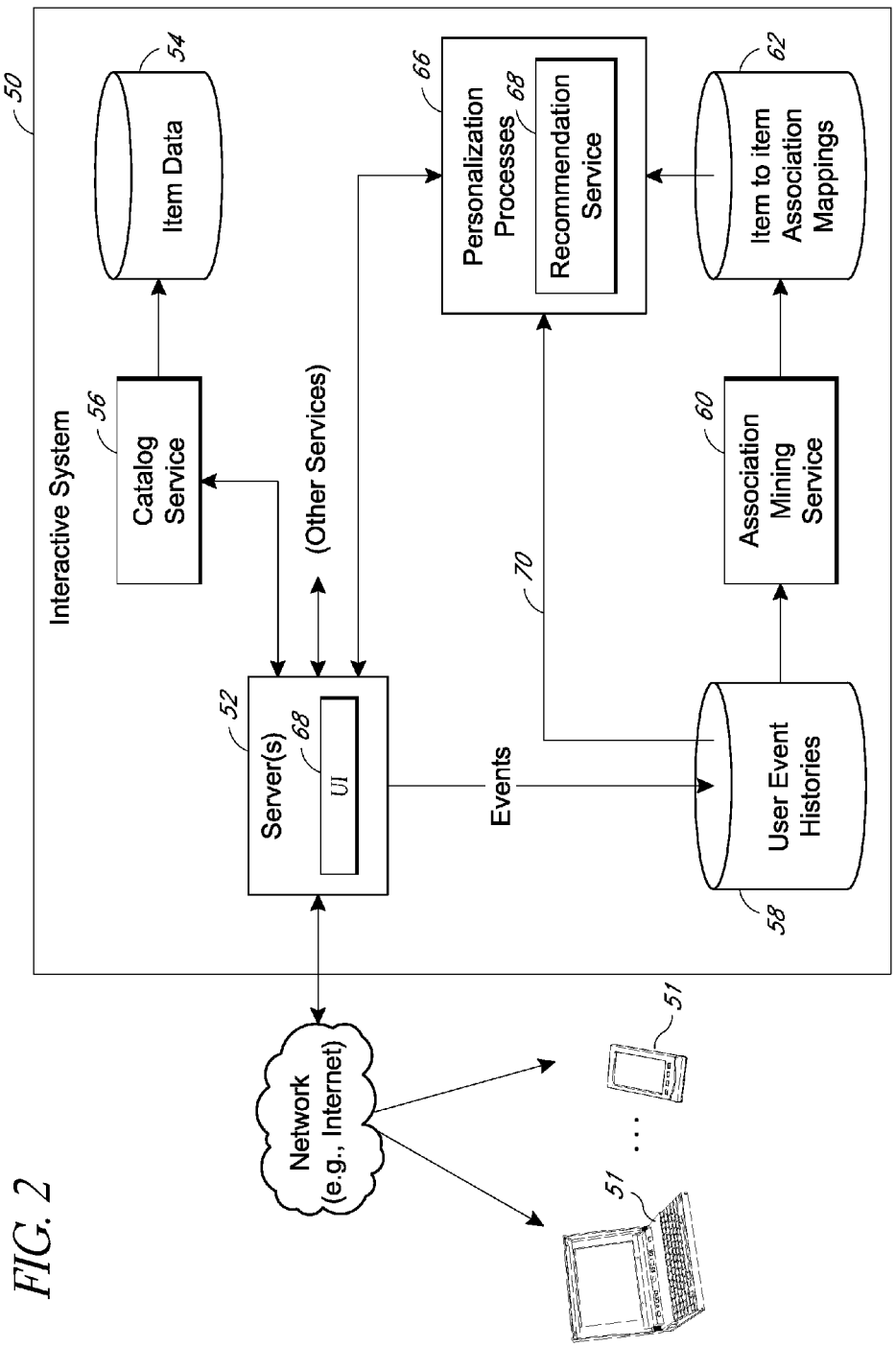
FIG. 2 illustrates the general architecture of an interactive system that provides an item rating interface of the type show in FIG. 1.

FIG. 2 illustrates one embodiment of an interactive system 50 that provides the above-described features. The system 50 includes a server 52 that provides network-based user access to an electronic catalog of items that are available for purchase, rental, download, and/or other transaction types. The server 52 may include multiple distinct server machines, such as web server machines. For purposes of illustration, it will be assumed that the system 50 hosts a web site that provides functionality for enabling users to purchase items represented in the catalog, although this need not be the case. The interactive system 50 may be accessed by users via one or more types of user computing devices 51, such as personal computers, smartphones, and tablet computers.

As is conventional, the electronic catalog may include a distinct item detail page (also referred to as a product detail page) for each item, and may include a hierarchical browse tree for browsing the items by item category. Information about the various items (product images, descriptions, prices, etc.) is stored in an item database 54 or other data repository. The server 52 retrieves item data from the database 54 via a catalog service 56, and populates web pages with such item data. The various components for dynamically generating web pages, including item rating pages of the type shown in FIG. 1, are represented by the user interface (UI) block 68 in FIG. 2.

As users browse the electronic catalog and perform various types of actions (such as rating items, purchasing items, etc.), the system records one or more types of item-related events in a behavioral-event data repository 58. This data repository 58 may, in some implementations, include multiple distinct log files and/or databases. The recorded events may include, for example, item purchase events, item viewing events (which may be based on visits to item detail pages), "shopping cart add" events, "wish list add" events, item rating events, and/or any other type of user action that evidence users' interests in particular catalog items or item categories. Some or all types of events may be recorded in association with the corresponding user, such that item preference profiles are maintained for specific users.

The recorded events or event histories are analyzed periodically by an association mining service 60 to detect behavioral relationships (also called "behavioral associations") between particular items. For example, if a relatively large fraction of those who purchase item A also purchase item B, the association mining service 60 may generate an item-to-item association mapping between these two items. The item-to-item associations may be detected using any of a variety of methods that are known in the art, including the methods described in U.S. Pat. Nos. 7,685,074 and 7,827,186, the disclosures of which are hereby incorporated by reference. Although the associations are typically based on monitored user behaviors, they may additionally or alternatively be based on detected similarities between item attributes or content.

The item-to-item associations detected by the association mining service 60 are recorded in a data repository 62 as item-to-item mappings. The item-to-item mappings are used by one or more personalization services 66, including a recommendation service 68, to provide personalized content to users. Each item-to-item mapping maps a particular "source" item to a related item (or list of related items), and may be used as a basis for recommending the related item(s) to users. For example, a mapping of item A to item B may be used as a basis to recommend item B to users who purchase, view, or favorably rate item A. As described in U.S. Pat. No. 7,685,074, referenced above, different datasets of item-to-item mappings may be generated based on different types of user behaviors (purchases, item viewing events, etc.), and these datasets may be used in various contexts to provide item recommendations to users. For example, the item-to-item mappings may be used to provide personalized recommendations that are based on a particular user's purchases, item ratings, and/or other item preference information.

In a typical recommendations scenario, a list of items known to be of interest to the user (e.g., items the user has purchased or favorably rated) are passed to the recommendation service 68, as represented by arrow 70 in FIG. 2. The recommendation service 68 then uses the item-to-item association mappings 62 to generate a list of recommended items to present to the user. As part of this process, the recommendation service 68 may filter out from a preliminary recommendations list any items that have already been purchased, rated, or designated as "owned" by the target user.

The recommendation service 68 shown in FIG. 2 may also use other types of association mappings to generate personalized recommendations. For example, the recommendation service 68 may use entity-to-item association mappings, where an "entity" can be, for example, an author, artist or brand. For instance, and entity-to-item mapping of a particular author to a particular movie may be used as a basis for recommending the movie to a user who favorably rates, or otherwise shows an interest in, the author. In addition, the recommendation service 68 may use entity-to-entity mappings, and/or item-to-entity mappings, to generate personalized entity recommendations for users. These and other types of associations may be mined automatically from the aggregated user event histories 58, and/or may be created manually by system administrators.

As will be recognized, the item rating interface of the present disclosure can be used with other types of recommendation and personalization services, including recommendation services that do not use item-to-item association mappings. For example, the item rating interface may be used in a system that uses a conventional collaborative recommendations engine that matches users to similar users as a basis for selecting items to recommend. Thus, the invention is not limited to systems that use item-to-item association mappings as a basis for recommending items.

Figure 3:
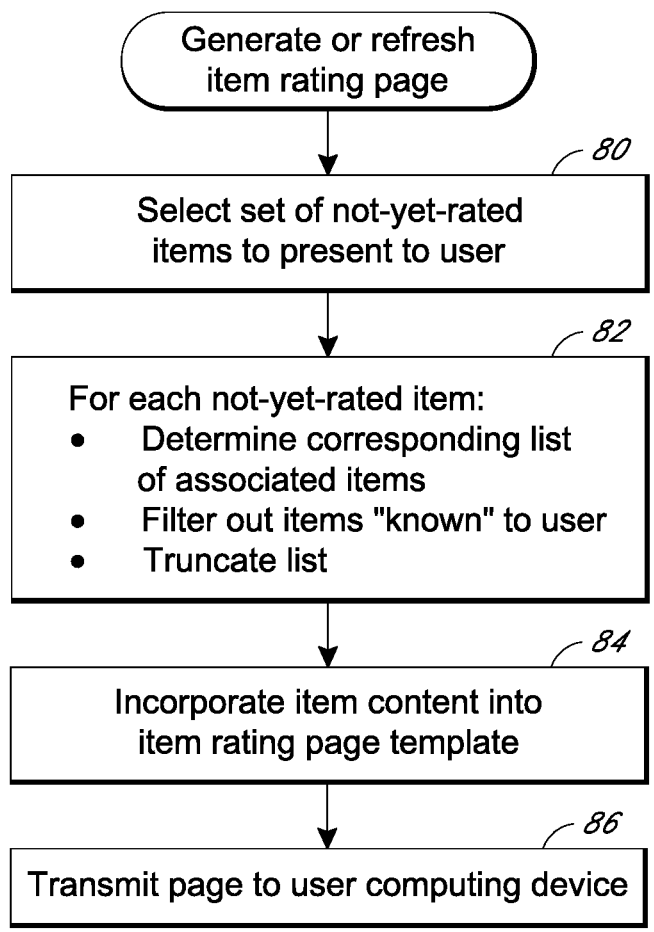
FIG. 3 illustrates one embodiment of a process that may be implemented by an interactive system, such as the system of FIG. 2, to generate a user interface of the type shown in FIG. 1.

FIG. 3 illustrates a process that may be implemented by the interactive system 50 to generate personalized item rating pages 26 of the type shown in FIG. 1. This process may be executed whenever a user computing device 51 requests an item rating page 26 or requests a refresh of such a page. In block 80, a set of not-yet-rated items is selected to present to the user for rating. Any appropriate item selection algorithm may be used for this purpose. For example, the items may be selected from one or more of the following groups: (1) the most popular items (based on sales, ratings, or some other user activity), (2) personalized item recommendations generated for the user by the recommendation service 68 or some other recommendation algorithm, and (3) items identified by staff or by an automated process as being useful for determining unique characteristics of users. Any items that have already been purchased, rated, or tagged as "owned" by the user are filtered out or otherwise omitted.

Figure 4:
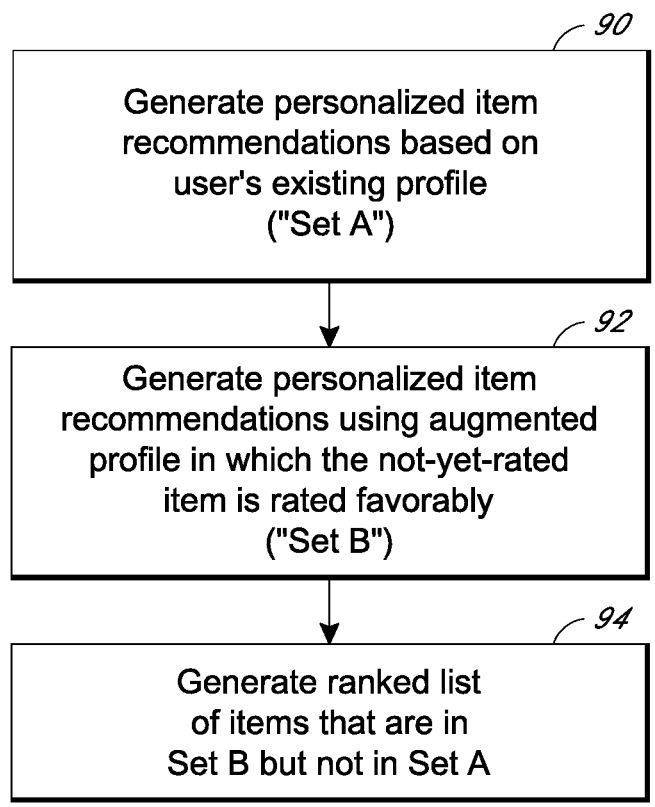
FIG. 4 illustrates an alternative process that may be used in FIG. 3 to identify the recommended items corresponding to a not-yet-rated item.

In block 82 of FIG. 3, the following steps are performed for each not-yet-rated item to generate a corresponding "downstream recommendations" list 34. First, a corresponding list of associated items is looked up from the item-to-item association mappings 62. In one embodiment, a dataset of purchase-based item-to-item associations is used for this purpose, and the list is a ranked list in which the items are ranked in terms of the degree of association with the not-yet-rated item. Second, this list of associated items is filtered to remove any items that are already "known" to the user, such as items that have been rated, purchased, or tagged as "owned" by the user. (Additional filtering may optionally be performed to remove any items that differ significantly in character from the others.) Third, the filtered list is truncated to the desired length, such as by retaining the top-ranked N items (where N is typically in the range of 1 to 10). FIG. 4, which is discussed below, describes an alternative method that may be used to generate the downstream recommendations lists 34. The tasks associated with blocks 82 and 84 may be performed by a personalization process 66.

In block 84 of FIG. 3, a server 52 constructs the item rating page 26 based on the items identified in blocks 82 and 84. In one embodiment, this involves accessing the catalog service 56 to retrieve the relevant catalog content (product images, etc.) of the items, and then populating an item rating page template. Appropriate JavaScript or other executable code may also be included for updating the page based on mouse-over events, "Like" events, page refresh events, and other types of user-driven events. For example, each popover that is capable of being displayed on the page may be implemented using an HTML Div element, and with associated JavaScript for hiding and showing this element. In block 86, the item rating page is transmitted by a server 52 to the requesting user computing device 51 for display.

In some embodiments, the item rating page or interface 26 may alternatively be constructed in whole or in part by a user computing device 51 based on information received from the server 52. For example, a mobile shopping app may generate the display page on a smartphone or a tablet device.

FIG. 4 illustrates an alternate process that may be used by the interactive system 50 to generate the downstream recommendations lists 34. This alternate process may be used with any recommendation engine or service that is capable of generating personalized item recommendations based in whole or in part on item ratings of users, including but not limited to recommendation services 52 that use item-to-item mappings 62. In block 90, a recommendation service is invoked to generate a first ranked set of personalized item recommendations ("set A") based on the user's existing profile. In block 92, the recommendation service is invoked to generate a second ranked set of personalized item recommendations ("set B") based on an augmented profile in which the user is assumed to have favorably rated the not-yet rated item. In block 94, these two sets are compared to identify the items (or at least the top ranked items) that appear in set B but not set A. These are the "downstream recommendation" items 34 that will tend to be recommended to the user if the user favorably rates the not-yet-rated item in question.

One possible variation to the processes shown in FIGS. 3 and 4 is to analyze each downstream recommendations list 34 (ideally before the lists are truncated for display) to identify the characterizing attributes of each such list. These characterizing attributes may then be communicated to the user, either instead of or in addition to the actual list of items 34. For example, a user may be informed that a favorable rating of a particular item will tend to result in recommendations of "black dress shoes," or of "productivity applications for smartphones."

The various components shown in FIG. 2, and the various processes described above (including those shown in FIGS. 3 and 4) may be implemented in a computing system via an appropriate combination of computerized machinery (hardware) and executable program code. For example, the catalog service 56, association mining service 60, recommendation service 68, and other personalization services 66 may each be implemented by one or more physical computing devices (e.g., servers) programmed with specific executable service code. Each such computing device typically includes one or more processors capable of executing instructions, and a memory capable of storing instructions and data. The executable code may be stored on any appropriate type or types of non-transitory computer storage or storage devices, such as magnetic disk drives and solid-state memory arrays. Some of the services and functions may alternatively be implemented in application-specific circuitry (e.g., ASICs or FPGAs). The various databases and data repositories 54, 58, 62 shown in FIG. 2 may be implemented using relational databases, flat file systems, tables, and/or other types of storage systems that use non-transitory storage devices (disk drives, solid state memories, etc.) to store data. Each such data repository may include multiple distinct databases. In a typical implementation, the recommendations provided to users, including the downstream recommendations 34 presented by the item ratings interface 26, are based on an automated analysis of many millions of recorded actions of many thousands or millions of users. As explained above, the item rating interface 26 may, in some embodiments, be implemented partly or wholly in client-side application code that runs on users' computing devices.

The foregoing embodiments have been presented by way of illustration, and not limitation. Thus, nothing in the foregoing description is intended to imply that any particular feature, characteristic or step is essential to the invention. For example, although portions of this disclosure refer to a web site that provides online shopping functionality, the invention is not limited either to web site based implementations or to shopping systems.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. An interactive system, comprising:
   a server that provides network-based access to an electronic catalog of items, said server providing a user interface that includes functionality for users to rate individual catalog items; and
   a recommendation service that generates personalized recommendations of catalog items for users based at least partly on the ratings assigned by the users to particular catalog items;
   said server configured to generate, for a user, a personalized page that provides functionality for the user to rate at least one catalog item, and to view, prior to rating the catalog item, information regarding items that would be recommended to the user by the recommendation service as a result of the user favorably rating the item, the personalized page thereby enabling the user to assess a downstream effect of favorably rating the catalog item before rating the catalog item.

2. The interactive system of claim 1, wherein the information regarding items that would be recommended includes a list of items that are representative of types of items that will be recommended if the user favorably rates the item.

3. The interactive system of claim 2, further comprising a personalization component that generates the list of items by a process that comprises:
   looking up, from a pre-generated data repository of item-to-item association mappings, a set of catalog items that are behaviorally associated with the catalog item; and
   filtering out, from the set of behaviorally associated items, one or more catalog items that, based on recorded information associated with the user, are already known to the user.

4. The interactive system of claim 2, further comprising a personalization component that generates the list of items by a process that comprises:
   generating, with the recommendation service, a first set of item recommendations based on an existing profile of the user;
   generating, with the recommendation service, a second set of item recommendations based on an augmented version of said profile, said augmented version reflecting a hypothetical favorable rating of the catalog item by the user; and
   determining, by comparing the first and second sets of item recommendations, one or more catalog items that are included in the second set of item recommendations but not the first set of item recommendations.

5. The method of claim 1, wherein the information regarding items that would be recommended to the user identifies item attributes characteristic of types of items that would be recommended.

6. The method of claim 1, wherein the personalized page, when presented on a user computing device, is responsive to use selection of the catalog item by displaying said information in a popover.

7. A computer-implemented method of notifying a user of a downstream effect of an item rating action, the method comprising:
   providing a user interface that includes functionality for users to rate individual catalog items of an electronic catalog;
   providing a recommendation service that generates personalized recommendations of items for users based at least partly on the ratings assigned by the users to particular catalog items;
   determining, by a computer system, a set of items that are representative of types of items that would be recommended for the user by the recommendation service as a result of the user favorably rating a particular catalog item; and
   notifying the user, via said user interface, of said set of items that are representative of types of items that would be recommended for the user as a result of the user favorably rating the particular catalog item, to thereby enable the user to assess a downstream effect of favorably rating the particular catalog item before favorably rating the particular catalog item.

8. The method of claim 7, wherein determining the set of items comprises:
   looking up, from a pre-generated data repository of item-to-item association mappings, a set of items that are behaviorally associated with the particular catalog item; and
   filtering out, from the set of behaviorally associated items, one or more items that, based on recorded information associated with the user, are already known to the user.

9. The method of claim 7, wherein determining the set of items comprises personalizing the set of items for the user based on recorded information reflective of item preferences of the user.

10. The method of claim 7, wherein determining the set of items comprises:
    generating, with the recommendation service, a first set of item recommendations based on an existing profile of the user;
    generating, with the recommendation service, a second set of item recommendations based on an augmented version of said profile, said augmented version reflecting a hypothetical favorable rating of the item by the user; and
    determining, by comparing the first and second sets of item recommendations, one or more items that are included in the second set of item recommendations but not the first set of item recommendations.

11. The method of claim 7, wherein notifying the user comprises generating, and transmitting to a user computing device, a page that is responsive to user selection of the particular catalog item by displaying a popover that lists the determined set of items.

12. The method of claim 7, wherein the method is performed by an interactive computer system that includes the recommendation service, and wherein the set of items is determined using item selection criteria used by the recommendation service.

* * * * *